United States Patent
Hatada

Patent Number: 5,148,083
Date of Patent: Sep. 15, 1992

[54] DEMAGNETIZER

[75] Inventor: Hideo Hatada, Tokyo, Japan
[73] Assignee: Sony Corporation, Tokyo, Japan
[21] Appl. No.: 540,707
[22] Filed: Jun. 20, 1990

[30] Foreign Application Priority Data

Jun. 20, 1989 [JP] Japan .................................. 1-159298

[51] Int. Cl.$^5$ .............................................. H01J 29/06
[52] U.S. Cl. ............................................ 315/8; 315/85
[58] Field of Search .................. 315/8, 85; 361/267, 361/149, 150; 363/142

[56] References Cited

U.S. PATENT DOCUMENTS

| | | | |
|---|---|---|---|
| 3,617,800 | 11/1971 | Kazuo et al. | 315/8 |
| 4,024,427 | 5/1977 | Belhomme | 315/8 |
| 4,357,590 | 11/1982 | Belhomme | 315/8 |

OTHER PUBLICATIONS

Philco, a subsidiary of Ford Motor Company Part and Service Department, Television Service Bulletin.

*Primary Examiner*—Eugene R. LaRoche
*Assistant Examiner*—Tan Dinh
*Attorney, Agent, or Firm*—Hill, Van Santen, Steadman & Simpson

[57] ABSTRACT

A demagnetizer for generating a degauss magnetic field to a cathode-ray tube by supplying an output of an AC power source to a degauss coil via a thermistor of positive characteristic, wherein a voltage-dependent resistance element is connected in parallel with the degauss coil so as to prevent generation of any excessive degauss magnetic field.

4 Claims, 2 Drawing Sheets

DEMAGNETIZER

BACKGROUND OF THE INVENTION

1. Field of the Invention

The present invention relates to a demagnetizer and, more particularly, to a device capable of realizing an auto-degaussing operation in a cathode-ray tube (CRT).

2. Description of the Prior Art

An auto-degaussing operation is performed by causing flow of an attenuation AC exciting current in a degauss coil on the surface of a cathode-ray tube so as to eliminate any harmful influence of the terrestrial magnetism exerted on a scanning electron beam in the tube. And there is known an exemplary degaussing circuit employing a thermistor of positive characteristic.

Such conventional example has a demagnetizing circuit 1 as shown in FIG. 2, wherein an output of an AC power source 2 (normally a commercial power source) is supplied via a main switch 3 and a thermistor 4 of positive characteristic to a degauss coil 5.

The thermistor 4 has such positive characteristic as graphically represented by a curve K1 in FIG. 3, wherein the resistance of the thermistor 4 increases in accordance with temperature rise due to the self-heating phenomenon. Utilizing such characteristic, the degauss exciting current i flowing in the degauss coil 5 is so controlled that the peak value thereof is changed toward a zero level in accordance with the lapse of time as graphically shown in FIG. 4, whereby the electron-beam scanning space in the cathode-ray tube is magnetized by the degauss magnetic field generated from the degauss coil 5, in such a manner as to be retained free from any harmful influence of the terrestrial magnetism.

In the above structure, the positive-characteristic thermistor 4 is normally heated by a heating resistor 6 and is thereby held in a high resistance state.

When the demagnetizing circuit 1 of the constitution shown in FIG. 2 is employed in a demagnetizer with a commercial power supply used as the AC power source 2, if the supply voltage is different depending on the power distributed area, there arises a problem that, since the degauss exciting current i flowing in the degauss coil 5 is determined by the supply voltage of the AC power source 2, the intensity of the degauss magnetic field generated in the degauss coil 5 is varied due to such voltage difference, hence inducing a possibility of some unexpected harmful influence.

For example, the commercial supply voltages are 100 volts AC in Japan, 120 volts AC in U.S.A., 220 volts AC in the European countries, and 240 volts AC in U.K., respectively.

If any commercial power supply of a different voltage is used directly as the AC power source 2, then the intensity of the degauss magnetic field generated in the degauss coil 5 is rendered excessively great in case the supply voltage is higher, thereby raising some problems including undesired demagnetization of "transfer magnetic field" in the cathode-ray tube, and erroneous demagnetization of recorded information on a magnetic disk due to leakage of the degauss magnetic field to the outside when the disk is placed on the casing of a display unit or the like which incorporates the cathode-ray tube therein.

In the process of manufacture, the entire cathode-ray tube is intensely magnetized by the transfer magnetic field for rectifying the landing pattern of an electron beam in the tube, so that a mislanding pattern in the shape of, for example, a Japanese character "/\" or "inverted /\" can be corrected to consequently improve the yield rate in producing the cathode-ray tube.

In one of the methods adopted for solving such a problem, there are prepared a plurality of thermistor circuits having mutually different positive characteristics as represented by curves K21, K22 and so forth in FIG. 3 correspondingly to a plurality of predetermined supply voltages usable as the AC power source 2, and such thermistor circuits are selectively switched in conformity with the individual supply voltages so that the selected one is connected to the degauss coil 5. However, the device constitution as a whole is complicated due to the necessity of providing a plurality of such positive-characteristic thermistor circuits.

OBJECTS AND SUMMARY OF THE INVENTION

The present invention has been accomplished in view of the problems mentioned. And its object resides in providing an improved demagnetizer of a simplified structure which is capable of continuously holding an exciting current substantially at a constant value in a degauss coil despite occurrence of any change in the supply voltage of an AC power source.

According to one aspect of the present invention, there is provided a demagnetizer for generating a degauss magnetic field to a cathode-ray tube by supplying an output of an AC power source to a degauss coil via a thermistor of positive characteristic, wherein a voltage-dependent resistance element is connected in parallel with the degauss coil.

According to another aspect of the present invention, the voltage-dependent resistance element is a metal oxide variator.

According to a further aspect of the present invention, the AC power source is connectable to any of mutually different commercial supply voltages.

And according to an even further aspect of the present invention, the voltage-dependent resistance element is such that the resistance value thereof is reduced when the voltage applied thereacross is higher than the vicinity of 90 volts.

When this device is used at a different supply voltage, the voltage-dependent resistance element so functions as to suppress the degauss exciting current flowing in the degauss coil, thereby preventing generation of any excessive degauss magnetic field from the degauss coil.

The above and other objects and features of the present invention will be apparent in detail from the following description which will be given with reference to the illustrative accompanying drawings.

DESCRIPTION OF THE PREFERRED EMBODIMENT

Hereinafter an exemplary embodiment of the present invention will be described with reference to the accompanying drawings.

Figure 1:
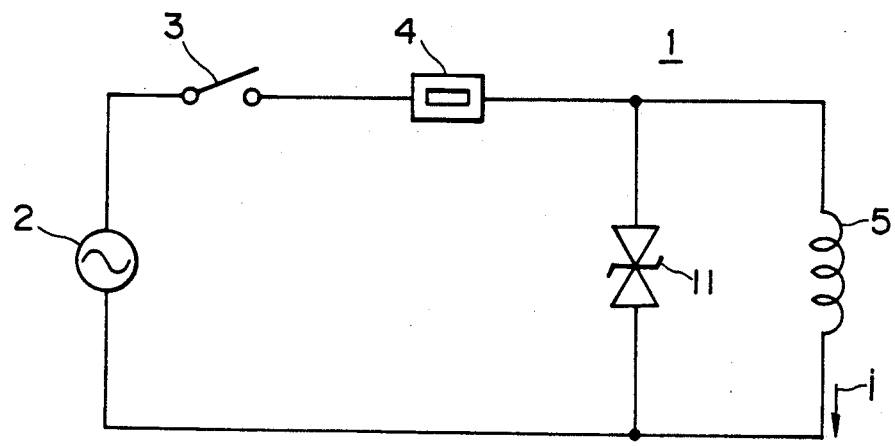
FIG. 1 is a connection diagram of an exemplary demagnetizer embodying the present invention.
Figure 2:
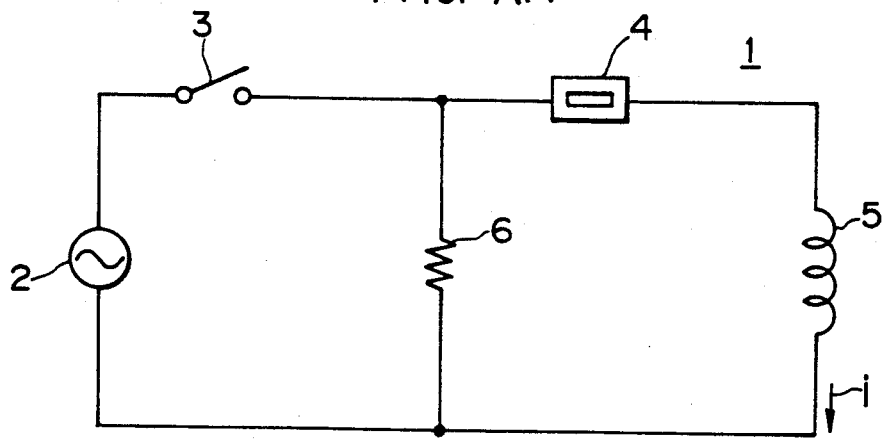
FIG. 2 is a connection diagram of a conventional demagnetizer.
Figure 3:
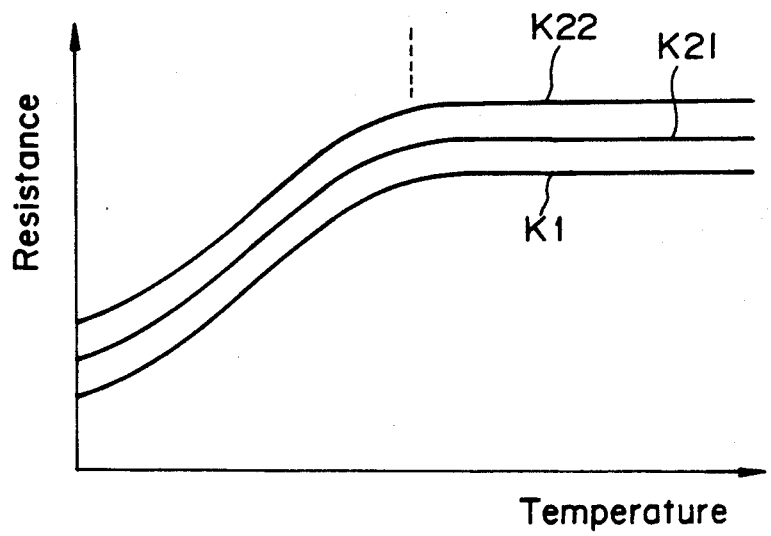
FIG. 3 graphically shows the temperature characteristic curves of positive-characteristic thermistors.
Figure 4:
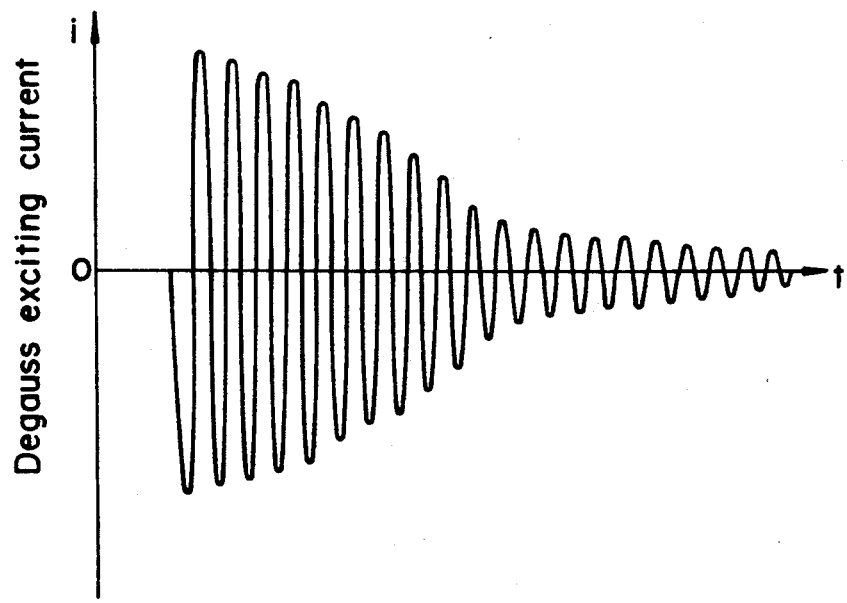
FIG. 4 is a signal waveform chart representing changes in a degauss exciting current flowing in a degauss coil.

In FIG. 1 where any components corresponding to those shown in FIG. 2 are denoted by the same reference numerals, a demagnetizing circuit 1 is so formed that a bidirectional constant-voltage element such as a metal oxide varistor 11 to serve as a voltage-dependent resistance element is connected in parallel with a degauss coil 5.

In this embodiment, when the degauss coil 5 employed has a resistance of 15 ohms, there are used a positive-characteristic thermistor 4 having a resistance of 20 ohms and a metal oxide varistor 11 having a holding voltage of 90 volts.

When the supply voltage of an AC power source 2 is set within a range of 100 to 240 volts in the constitution of FIG. 1, if the self-heated state of the thermistor 4 is not yet sufficient in the initial period immediately after turn-on of a main switch 3, the voltage drop in the thermistor 4 is very small. Therefore a voltage approximate to the set supply voltage is applied to one end of the thermistor 4 connected to the degauss coil 5, i.e., an excessive voltage is generated to the degauss coil 5.

In this stage of the operation, the resistance value of the varistor 11 is reduced in accordance with such excessive voltage, so that the voltage across the varistor 11 is maintained at the holding voltage, i.e. 90 volts.

Thus, the voltage across the varistor 11 can be suppressed to the holding voltage (90 volts) while none of excessive voltage is applied across the degauss coil 5, whereby the degauss exciting current i is also suppressed correspondingly thereto to consequently suppress the intensity of the degauss magnetic field generated from the degauss coil 5.

It has been experimentally confirmed that, when the supply voltage of the AC power source 2 is set to 240 volts, a peak current of 20 amperes $_{p-p}$ flows in the degauss coil 5 under the condition without connection of the varistor 11; whereas the degauss exciting current i can be suppressed to a peak value of about 12 amperes $_{p-p}$ by connecting the varistor 11.

Therefore, according to the constitution of FIG. 1, the degauss exciting current i flowing in the degauss coil 5 is not rendered excessive despite a rise of the supply voltage of the AC lower source 2, hence effectively averting undesired demagnetization of the transfer magnetic field or generation of any great leakage magnetic field to the outside that may otherwise be caused by the degauss magnetic field.

And the additional necessity is the provision of merely a single voltage-dependent resistance element (i.e. varistor 11) to eventually simplify the structure.

Although the heating resistor 6 shown in FIG. 2 is not provided in the embodiment mentioned, it is to be understood that a similar effect is also achievable even with the provision of such heating resistor.

Furthermore, the voltage-dependent resistance element is not limited to a bidirectional constant-voltage element such as a metal oxide varistor employed in the embodiment, and it may be any of other suitable elements as well.

Thus, according to the present invention as described hereinabove, it becomes possible to realize with facility a simplified demagnetizer which is capable of preventing generation of any excessive degauss magnetic field even with any of plural AC power sources of different supply voltages.

What is claimed is:

1. A demagnetizer for generating a degauss magnetic field to a cathode-ray tube by supplying an output of an AC power supply to a degauss coil via a thermistor of positive characteristic, wherein a voltage-dependent resistance element is connected directly in parallel with said degauss coil and wherein said thermistor is connected in series with the combination of said resistance element and said degauss coil.

2. A demagnetizer for generating a degauss magnetic field to a cathode-ray tube by supplying an output of an AC power source to a degauss coil via a thermistor of positive characteristic wherein a voltage-dependent resistance element is connected directly in parallel with said degauss coil, and wherein said voltage-dependent resistance element is a metal oxide varistor and wherein said thermistor is connected in series with the combination of said resistive element and said degauss coil.

3. A demagnetizer according to claim 2, wherein said AC power source is connectable to any of mutually different commercial supply voltages.

4. A demagnetizer according to claim 2, wherein said voltage-dependent resistance element in such that the resistance value thereof is reduced when the voltage applied thereacross is higher than the vicinity of 90 volts.

* * * * *